(12) United States Patent
Jang et al.

(10) Patent No.: US 8,120,835 B2
(45) Date of Patent: Feb. 21, 2012

(54) ELECTRO-PHORESIS DEVICE

(75) Inventors: Jaeeun Jang, Seoul (KR); Seungnam Cha, Seoul (KR); Jaeeun Jung, Seoul (KR); Jaiyong Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 39 days.

(21) Appl. No.: 12/385,978

(22) Filed: Apr. 27, 2009

(65) Prior Publication Data

US 2009/0308750 A1 Dec. 17, 2009

(30) Foreign Application Priority Data

Jun. 13, 2008 (KR) ................ 10-2008-0055841

(51) Int. Cl.
*G02B 26/00* (2006.01)
*G09G 3/34* (2006.01)
*G03G 17/04* (2006.01)

(52) U.S. Cl. ............... 359/296; 345/107; 430/32

(58) Field of Classification Search ............. 359/296, 359/245, 253–254, 265, 290–291; 349/33; 345/107; 430/31–32
See application file for complete search history.

(56) References Cited

U.S. PATENT DOCUMENTS

| | | | | |
|---|---|---|---|---|
| 6,639,580 B1* | 10/2003 | Kishi et al. | ..................... | 345/107 |
| 2003/0095094 A1* | 5/2003 | Goden | ......................... | 345/107 |
| 2004/0263947 A1* | 12/2004 | Drzaic et al. | .................. | 359/296 |
| 2005/0105161 A1* | 5/2005 | Nakai et al. | .................... | 359/296 |
| 2005/0190431 A1* | 9/2005 | Matsuda | ....................... | 359/296 |

* cited by examiner

*Primary Examiner* — Dawayne Pinkney
(74) *Attorney, Agent, or Firm* — Harness, Dickey & Pierce, P.L.C.

(57) ABSTRACT

Provided is an electro-phoresis device that includes a light control layer, a first electrode, a second electrode and a third electrode. The light control layer may include a plurality of electro-phoresis particles. The first electrode and the second electrode may form an electric field to control of the electro-phoresis particles such that the electro-phoresis particles move towards at least one of the electrodes. The third electrode may be electrically connected to any one of the first and second electrodes and may have an electric polarity opposite to the other of the first and second electrode.

7 Claims, 9 Drawing Sheets
(2 of 9 Drawing Sheet(s) Filed in Color)

ELECTRO-PHORESIS DEVICE

CROSS-REFERENCE TO RELATED APPLICATION

This U.S. non-provisional patent application claims priority under 35 U.S.C. §119 to Korean Patent Application No. 10-2008-0055841, filed on Jun. 13, 2008, the entire contents of which are incorporated herein by reference.

BACKGROUND

1. Field

Example embodiments relate to an electro-phoresis device.

2. Description of the Related Art

According to the conventional art, a particle phoresis method may be used in a reflection device or an optical shutter. According to such a method, an electric field may control the movement of particles. That is, after particles are charged to exhibit a positive or negative electric characteristic, an electric field may move the particles when the electric field is applied to electrodes located above and/or under a particle layer. A display device may take advantage of the above described phenomenon.

An electro-phoresis device may be classified into a passive matrix type and/or an active matrix type according to the drive method of the device (e.g., a liquid crystal display (LCD) device). Between these two types of classification, a disadvantage of the passive matrix type may be interference between pixels. In particular, the interference between pixels may be manifested as crosstalk between neighboring scanning lines. The crosstalk may increase as the drive voltage decreases or resolution increases.

SUMMARY

Example embodiments provide an electro-phoresis device with reduced crosstalk between pixels.

In example embodiments, an electro-phoresis device comprising a light control layer may include a light control layer, a first electrode, a second electrode and/or a third electrode. The light control layer may include a plurality of electro-phoresis particles. The first electrode and the second electrode provided at both sides of the light control layer may form an electric field, the electric field controlling the plurality of electro-phoresis particles. The third electrode may be electrically connected to one of the first and the second electrodes, having an electric polarity opposite to an electric polarity of the other of the first and second electrodes, and may be positioned on a plane different from planes where the first and second electrodes are positioned.

According to further example embodiments, a first substrate may include the first electrode, and a second substrate may include the second electrode, such that the one of the first substrate and the second substrate include the third electrode. The first electrode and the second electrode may be perpendicular to each other in an X-Y matrix, and the third electrode may be parallel to the one of the first electrode and the second electrode. A voltage of a same polarity may be applied to the third electrode and the one of the first and the second electrode. Also, a voltage of same polarity and a same magnitude may be applied to the third electrode and the one of the first and the second electrode.

According to further example embodiments, a unit pixel may be defined by a portion where the first electrode and the second electrode cross each other, and a plurality of the first electrode are provided in the unit pixel. The unit pixel may include the third electrode and the third electrode may be arranged between the plurality of the first electrode. The third electrode may be arranged parallel to the first electrode. A voltage of a same polarity may be applied to the third electrode and the second electrode. A voltage of a same polarity and a same magnitude may be applied to the third electrode and the second electrode.

BRIEF DESCRIPTION OF THE DRAWINGS

The accompanying figures are included to provide a further understanding of example embodiments, and are incorporated in and constitute part of this specification. In addition, the patent or application file contains at least one drawing executed in color. Copies of this patent or patent application publication with color drawings will be provided by the Office upon request and payment of the necessary fee. In the figures.

DETAILED DESCRIPTION OF EXAMPLE EMBODIMENTS

Figure 1:
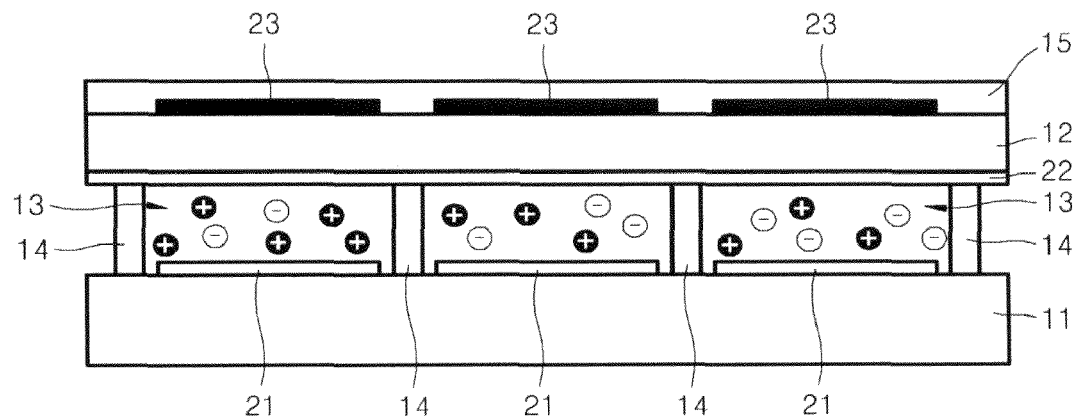
FIG. 1 is a cross-sectional view of an electro-phoresis device according to example embodiment.

Example embodiments may be embodied in many different forms and should not be construed as being limited to the embodiments set forth herein; rather, these embodiments may be provided so that this disclosure will be thorough and complete, and will fully convey the concept of example embodiments to those skilled in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments of an electro-phoresis device are described with reference to the attached drawings. In the description provided below, the example embodiments describe passive matrix type electro-phoresis devices.

A passive matrix type display may have a plurality of first electrodes and/or a plurality of second electrodes arranged in an X-Y matrix. The plurality of first electrodes may be arranged in strips and/or parallel to one another. Likewise, the plurality of second electrodes may be arranged in strips and/or parallel to one another, but also corresponding to the plurality of first electrodes.

FIG. 1 is a cross-sectional view of a part of an electro-phoresis device according to example embodiments. A first substrate 11 and/or the second substrate 12 may be arranged at a desired (or, alternatively, a predetermined) interval such that there is provided a chamber 13, in which electro-phoresis particles exist. Also, plurality of spacers 14 may maintain the interval between the first and second substrates 11 and 12. The plurality of spacers 14 may be arranged at a desired (or, alternatively a predetermined) interval in the chamber 13. The electro-phoresis particles may include two types of electrically charged particles (e.g., positively charged black particles (+) and/or negatively charged white particles (−)).

A first electrode 21 and/or a second electrode 22 may be respectively located on the inner surfaces of the first and/or second substrates 11 and 12. The first and second electrodes 21 and 22 may be arranged across from and/or parallel to each other. A third electrode 23 may be formed on the outer surface of the second substrate 12 and/or may be covered with a protection layer 15. The third electrode 23 may be arranged in the same direction as the first electrode 21. The third electrode 23 may receive a voltage of opposite polarity to that of the second electrode 22.

According to example embodiments, the electric potential of the first electrode 21 and the third electrode 22 may be of the same magnitude and/or same polarity. For example, the first and third electrodes 21 and 23 may have a positive polarity when the second electrode 22 has a negative polarity. In such a case, the same magnitude or different magnitudes of voltage may be applied to the first and third electrodes 21 and 23. In contrast, the first and the third electrodes 21 and 23 may have a negative polarity when the second electrode 22 has a positive polarity. In such a situation, the magnitude relationship between the first and third electrodes 21 and 23 may be similar to the bias condition described above. The second electrode 22 may have an electric potential level relative to the first electrode during operation of a pixel. When a pixel is not selected, the second electrode 22 may be maintained in an electrically floating state. An electrically floating state may include when the second electrode 22 is electrically separated from the first and/or third electrodes 21 and 23.

Operation of an electro-phoresis display having a three electrodes structure according to example embodiments is described below. The electro-phoresis display according to the example embodiments may be configured as described above.

Figure 2:
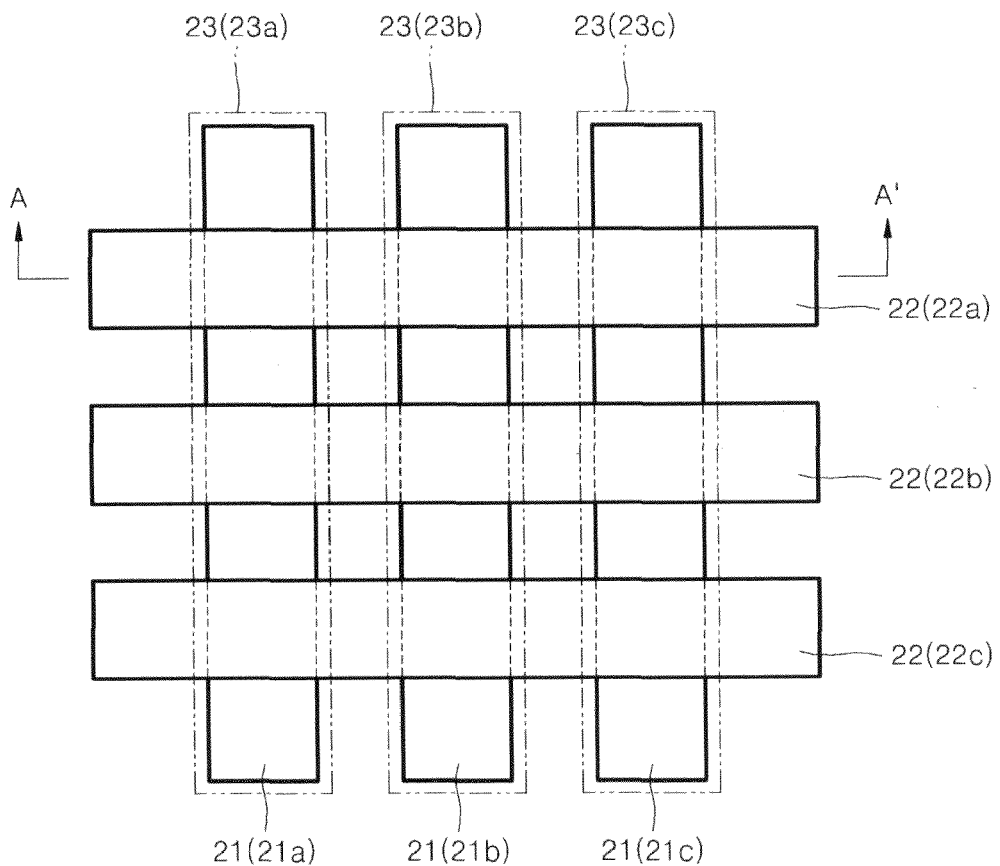
FIG. 2 illustrates a schematic layout of the electro-phoresis device of FIG. 1.

FIG. 2 illustrates a schematic layout of a 3×3 electro-phoresis display. Pixels may be provided both vertically and/or horizontally. The structure in FIG. 2 corresponds to that of FIG. 1. In particular, FIG. 1 corresponds to a cross-sectional view of FIG. 2, taken along line A-A'.

As shown in FIG. 2, the first electrodes 21a, 21b, and/or 21c and the second electrodes 22a, 22b, and/or 22c may cross each other. The third electrodes 23a, 23b, and/or 23c may be parallel to the first electrodes 21a, 21b, and/or 21c. Accordingly, the pixels for displaying an image may be defined at the points where the first electrodes 21a, 21b, and/or 21c and the second electrodes 22a, 22b, and/or 22c, respectively meet. The electro-phoresis particles, which have opposite polarities, may move in opposite directions. This movement may be determined by the voltage bias applied to the first electrodes 21a, 21b, and/or 21c and the second electrodes 22a, 22b, and/or 22c.

The electro-phoresis particles may be of a desired (or, alternatively, predetermined) color. Also, the electro-phoresis particles may move in a direction in which light is incident. In example embodiments, the light may be incident on the second substrate 12 such that the electro-phoresis particles may move toward it. In such a case, the electro-phoresis particles may reflect and/or absorb said light such that the desired (or, alternatively, predetermined) color can be displayed. For example, when black positive electro-phoresis particles move toward the second substrate 12, a black color may be displayed.

Figure 3:
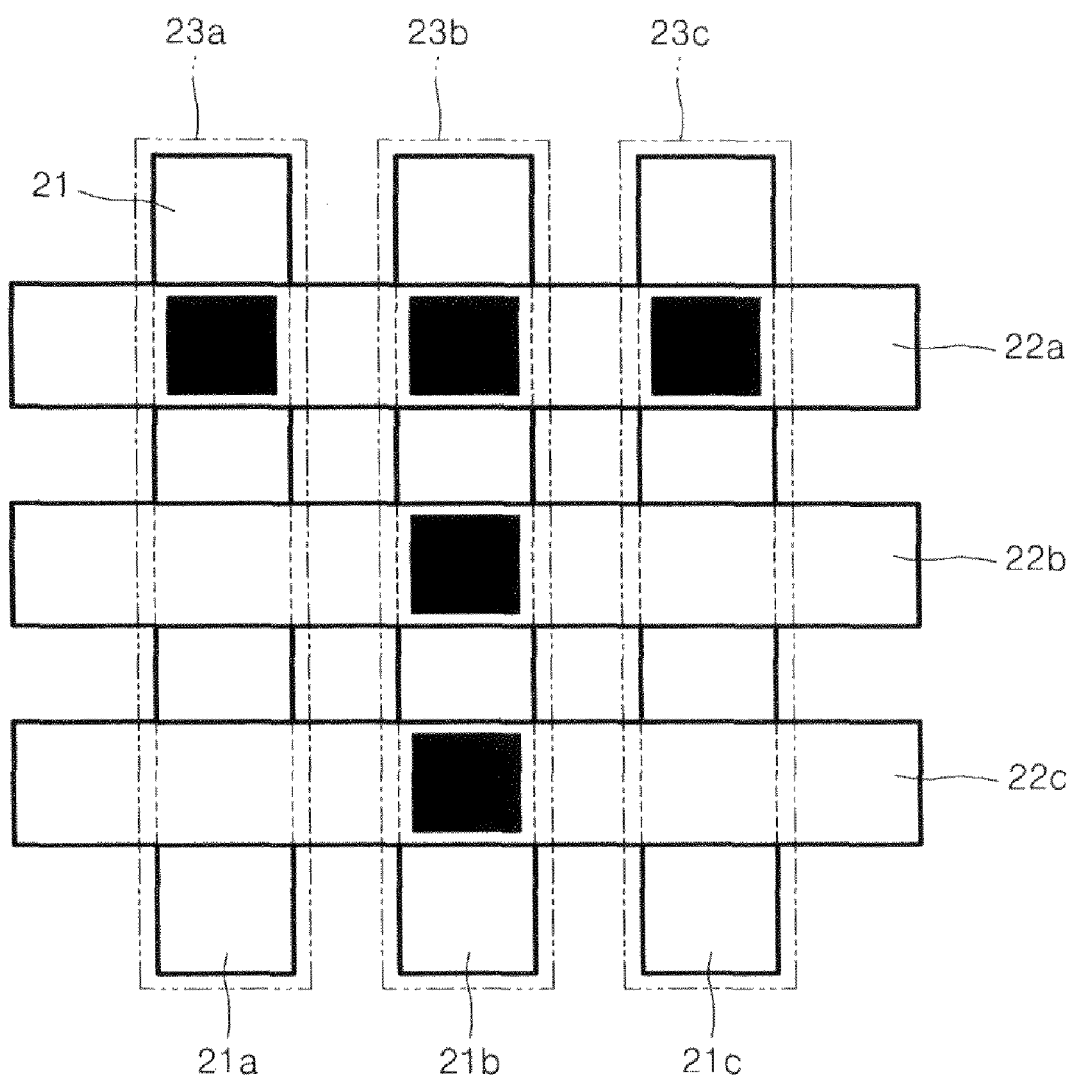
FIG. 3 illustrates the operation of the electro-phoresis device according to an example embodiment.

FIG. 3 illustrates the operation of the electro-phoresis device according to example embodiment. According to FIG. 3, applying a voltage to each electrode may permit a letter "T" to be displayed on an electro-phoresis display. In example embodiment, the same voltage may be applied to the first and third electrodes 21 and 23. The application of a voltage to the third electrode 23 is not shown in FIG. 3.

To aid in the explanation of FIGS. 4 to 6, electrodes arranged in a row direction are referred to as scan electrodes (corresponding to the second electrode 22) such that scan electrodes 22a, 22b, and/or 22c correspond with each row. Likewise, electrodes arranged in a column direction are referred to as data electrodes (corresponding to the first electrode 21) such that data electrodes 21a, 21b, and/or 21c correspond with each column. Also, the base voltage of the scan electrodes is assumed to be 10V.

Figure 4A:
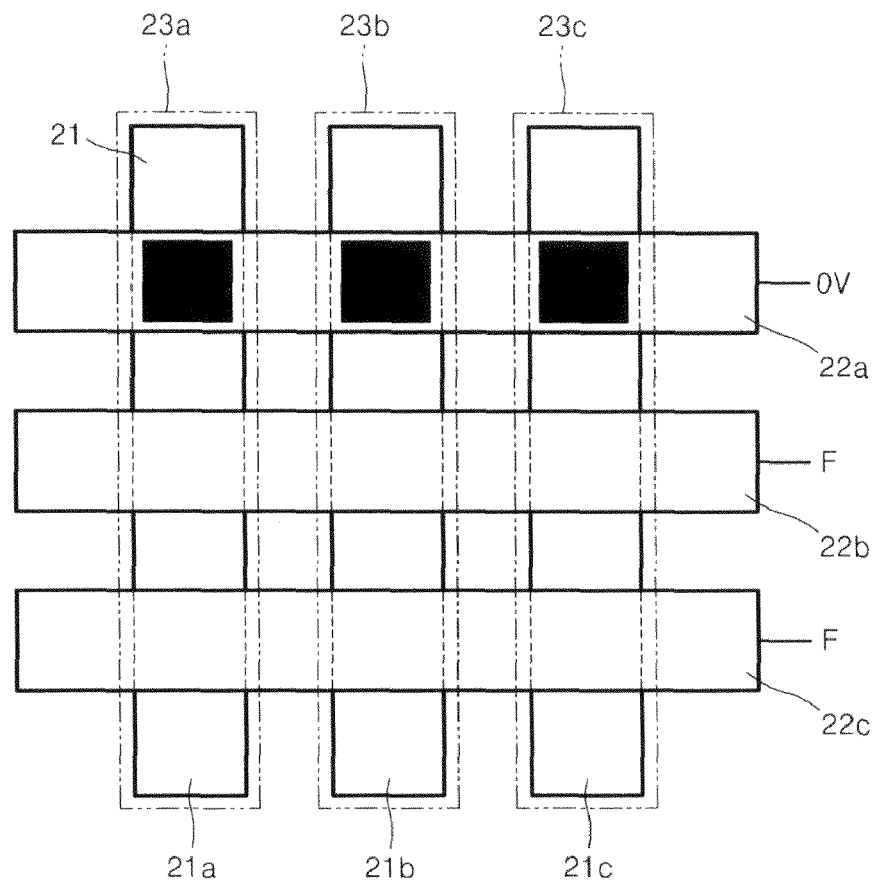
FIGS. 4A, 4B, 5A, 5B, 6A, and 6B illustrate the image display process of the electro-phoresis device according to example embodiment.
Figure 4B:
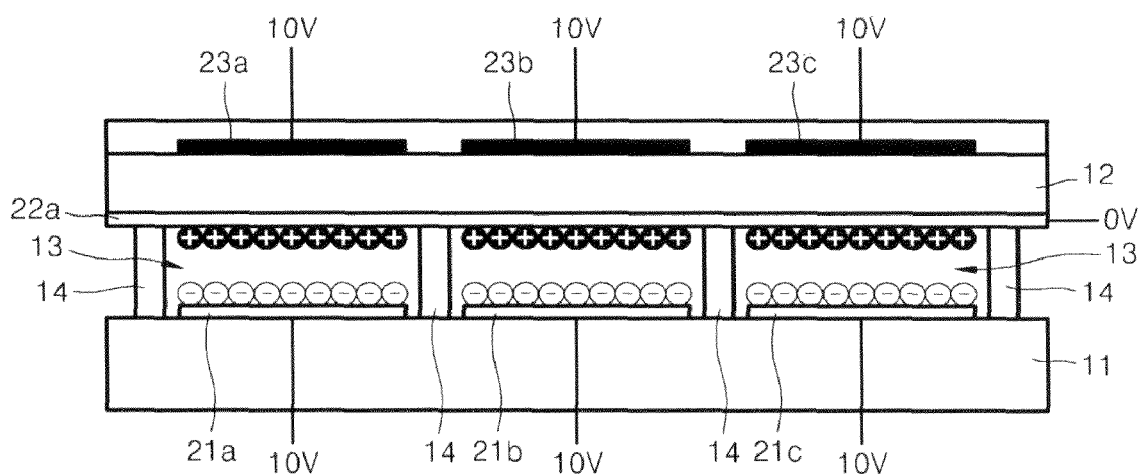

The chamber 13 may include positively charged electro-phoresis particles at a desired (or, alternatively, predetermined) color. The positively charged electro-phoresis particles may be black. In FIG. 4A, the first scan line, scan electrode 22a, may receive a voltage of 0 V. Providing a 0 V bias to scan electrode 22a may require all the pixels on electrode 22a to turn a black color. In such a case, a voltage of 10 V may be applied to all of the data electrodes 21a, 21b, and/or 21c in order to change all pixels on the first scan electrode 22a to black. As a result, the positively charged black electro-phoresis particles may move toward the electrode 22a. As a result, the pixels on the first scan electrode 22a may display black color, as shown in FIG. 4B. The unselected second and/or third scan electrodes 22b and 22c may be in an electrically floating state. Thus, an electric field may not be formed between each of the second and/or third scan electrodes 22b and 22c and the data electrodes 21a, 21b, and/or 21c, which cross one another.

Figure 5A:
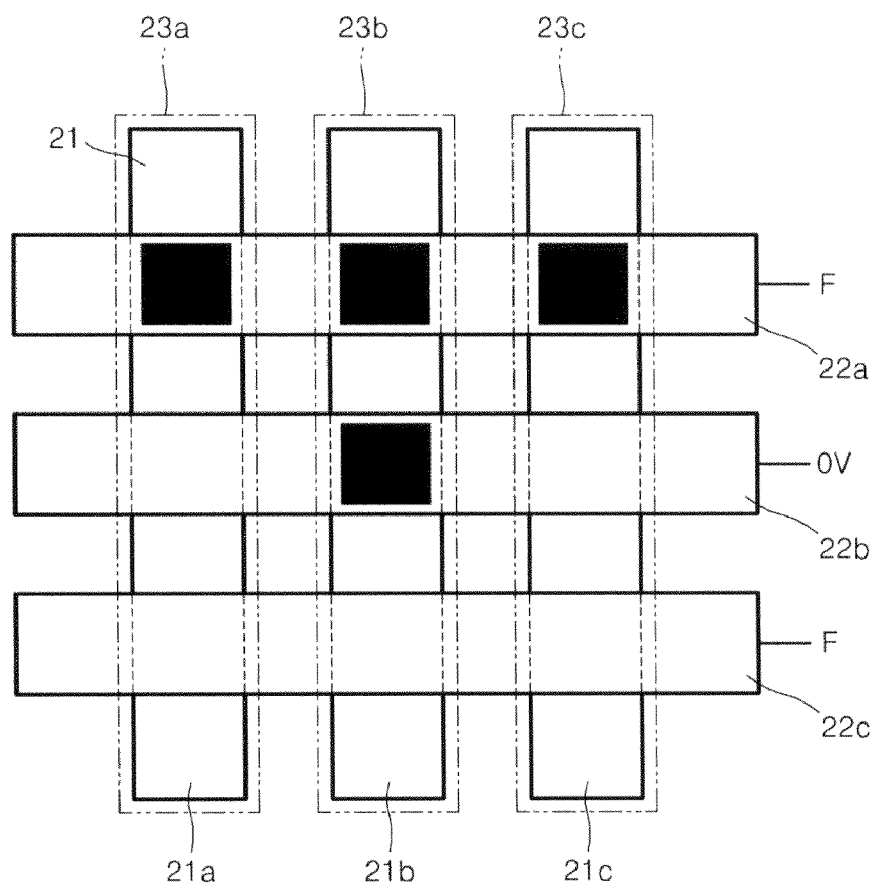
Figure 5B:
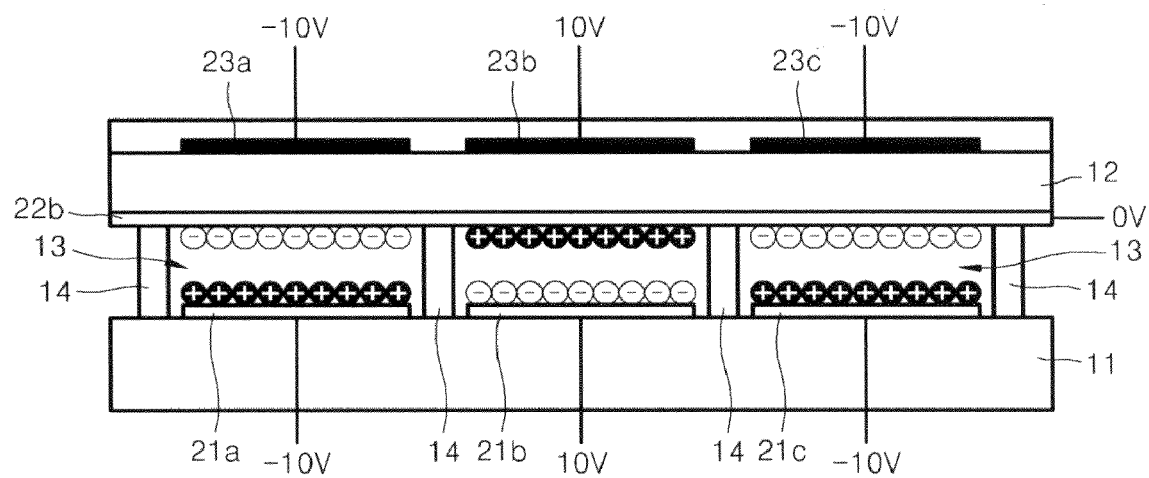

Referring to FIG. 5A, a voltage of 0 V may be applied to the second scan electrode 22b while the other scan electrodes remain in an electrically floating state. In such a state, a voltage of 10 V may be applied to the second data electrode 21b and/or a voltage of −10 V may be applied to the first and third data electrodes 21a and 21c. Accordingly, the electro-phoresis particles in the second scan line may move in the manner shown in FIG. 5B. However, since the first and/or third scan electrodes 22a and 22c are in an electrically floating state, an electric field may not be formed. This is true regardless of the application of a voltage to the data electrode 21. Furthermore, the electric-phoresis particles corresponding with the pixels of the first scan electrode 22a (previously subject to the operation described in FIGS. 4A and 4B) do not move from their previous state when the second scan electrode 22b is selected. No electric field is needed for movement of the electro-phoresis particles corresponding with the pixels in the first scan electrode 22a. This is because (i) the first scan electrode may be in an electrically floating state and/or (ii) the data electrodes 21a and/or 21c and the third electrodes 23a and/or 23c (which are parallel to the data electrodes 21 and/or 21c) may have the same electric potential. That is to say, the pixels on the first scan electrode 22a may maintain the original image display state, which is the state illustrated in FIG. 4A (e.g., a memory state).

Figure 6A:
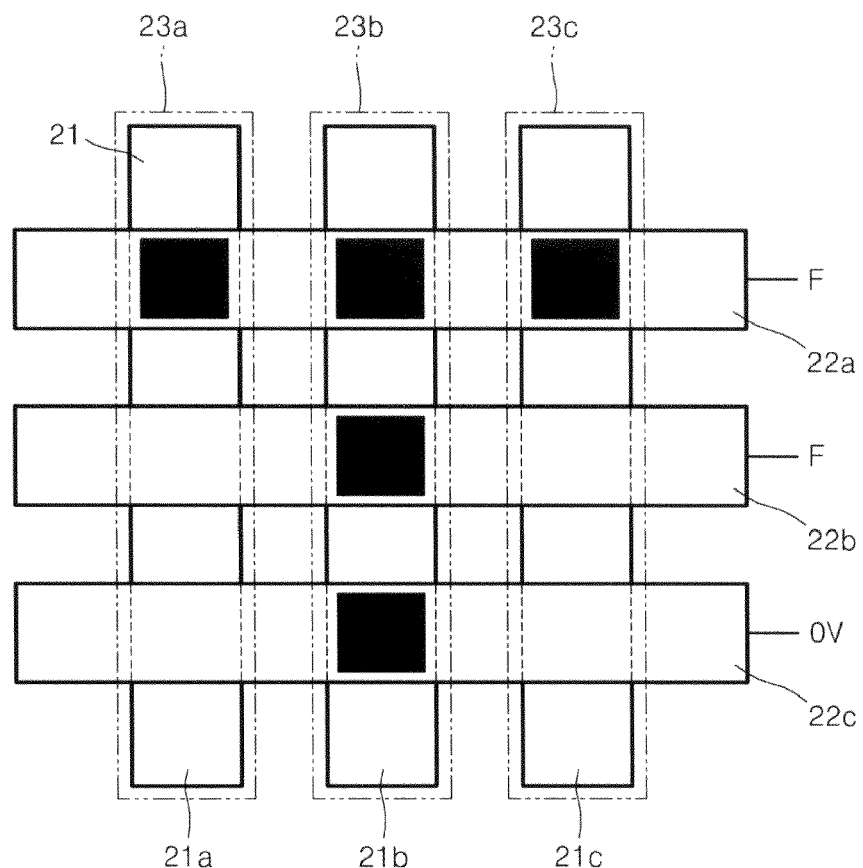
Figure 6B:
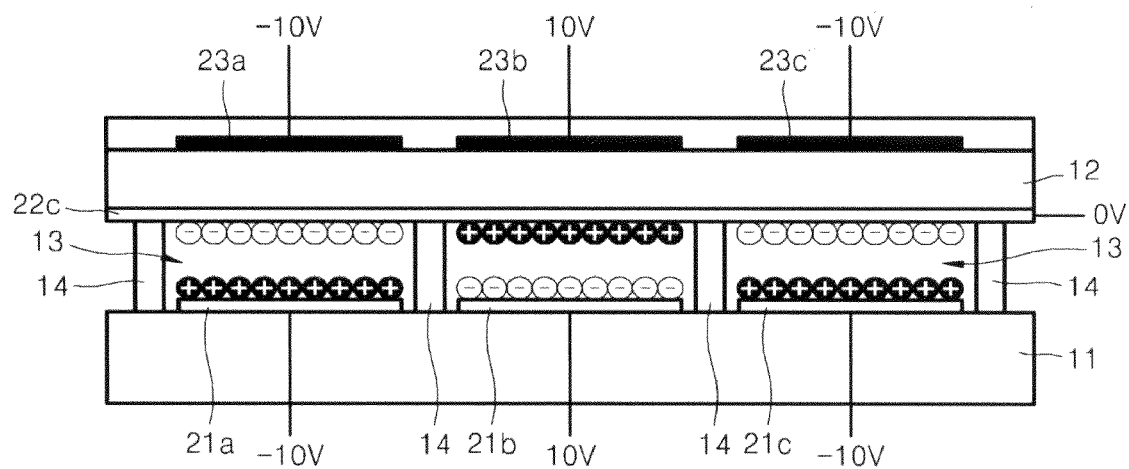

Referring to FIG. 6A, a voltage of 0 V may be applied by selecting the third scan electrode 22c, while the other scan electrodes remain in an electrically floating state. In this state, a voltage of 10 V may be applied to the second data electrode 21b and/or a voltage of −10 V may be applied to the first and the third data electrodes 21a and 21c. Accordingly, the electro-phoresis particles may move in the third scan line in the manner shown in FIG. 6B. This may display an image in the shape of a letter "T". Furthermore, since no electric field is formed in the pixels corresponding to the first and/or second scan electrodes 22a and 22b, the positions of the previously moved electric-phoresis particles of corresponding scan electrodes may be maintained unchanged.

The electro-phoresis display according to the example embodiments described may further include the third electrode 23. The same polarity applied to the first electrode 21 may be applied to the third electrode 23. Since the unselected scan line is in an electrically floating state, the application of a voltage to one scan electrode may not affect the pixels corresponding to other neighboring scan electrodes.

The third electrode 23 improves the electro-phoresis device. For example, in an electro-phoresis device without the third electrode 23, the unselected scan lines, in an electrically floating state, may be affected by the electric field of the neighboring selected scan line.

Figure 7A:
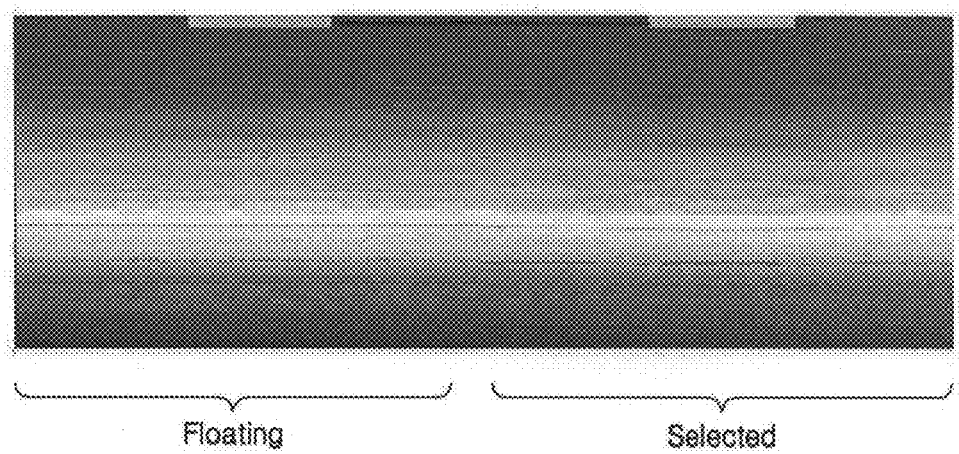
FIG. 7A illustrates a simulation result for an electric field distribution of an electro-phoresis device having a conventional structure with no third electrode according to a comparative embodiment.
Figure 7B:
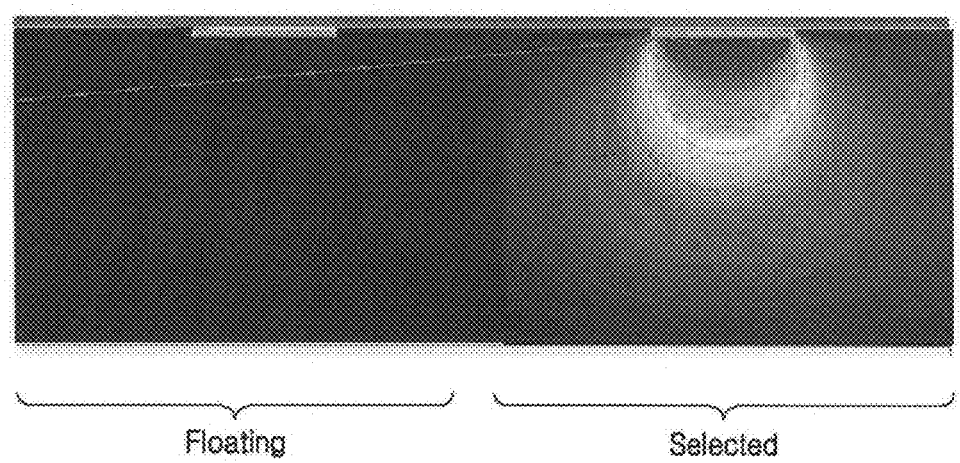
FIG. 7B illustrates a simulation result for an electric field distribution of an electro-phoresis device in which the third electrode is formed according to an example embodiment.

FIG. 7A illustrates a result of a simulation of an electro-phoresis device without a third electrode. In contrast, FIG. 7B illustrates a result of an electric-field forming simulation of an electro-phoresis device according to example embodiments. In FIGS. 7A and 7B, the term "Floating" signifies the distribution of an electric field at a pixel on the unselected scan electrode and the term "Selected" signifies the distribution of an electric field at a pixel on a selected other scan electrode adjacent to the pixel of the unselected scan electrode.

FIG. 7A illustrates that without the third electrode, an electric field is formed in the pixel area corresponding with the unselected scan electrode (labeled Floating). As stated above, the unselected scan electrode is in an electrically floating state. However, due to the electric field formed in the pixel area corresponding with the selected scan electrode (labeled Selected), the pixel area corresponding with the unselected scan electrode also exhibits a field.

In contrast, FIG. 7B illustrates an electro-phoresis display according to example embodiments, which includes the third electrode. In said figure, the electric field distribution may be formed only in the selected pixel area (Selected) and not in the unselected other pixel area (Floating). Thus, according to example embodiments, the external electric field may be blocked by the data electrode (first electrode) and/or the third electrode. Both data electrode (first electrode) and/or the third electrode may receive an electric potential of a same polarity to prevent crosstalk by neighboring pixels.

Figure 8:
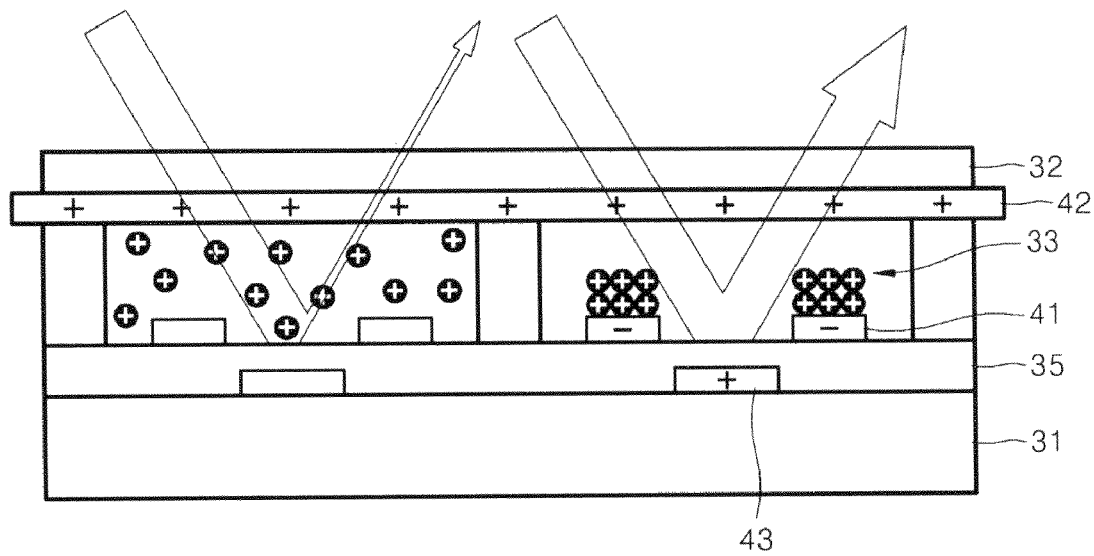
FIG. 8 is a cross-sectional view of an electro-phoresis device according to another example embodiment.

FIG. 8 is a cross-sectional view of an electro-phoresis device according to example embodiments. A first substrate 31 and a second substrate 32 may be arranged to face each other. A chamber 33, in which electro-phoresis particles are positioned, may be provided between the first and/or second substrates 31 and 32. A first electrode 41 and/or a second electrode 42 may be respectively formed on the inner surfaces of the first and/or second substrates 31 and 32. The first electrode 41 and the second electrode 42 may be arranged to face and/or cross each other, consistent with a general passive matrix structure. In each unit pixel area, there may be a plurality of first electrode 41 at a desired interval. In FIG. 8, there are two first electrodes 41 at a particular interval. A third electrode 43 may be located under a portion between the two first electrodes of each unit pixel. An insulation layer 35 may be located between the first electrodes 41 and/or the third electrode 43. The third electrode 43 may be parallel to the first electrode 41.

According to the shown in FIG. 8, most incident light may be absorbed and/or dispersed when the electro-phoresis particles are distributed throughout a pixel area since an electric field does not exist (the left pixel of FIG. 8). When an electric field exists, the electro-phoresis particles may be concentrated on the two first electrodes 41. Thus, most incident light may be reflected since an empty space exists between the two first electrodes 41. That is, since the electro-phoresis particles are moved horizontally (in a direction parallel to the first and/or second substrates) light may be blocked or reflected according to the position of the electro-phoresis particles, thereby displaying an image.

The third electrode 43 may prevent the electro-phoresis particles from remaining between the two first electrodes 41 when (i) an electric field is applied and/or (ii) the electro-phoresis particles are moved toward the first electrode 41. Third electrode 41 receives a voltage of the same polarity and/or same magnitude as that of the second electrode 42.

Figure 9:
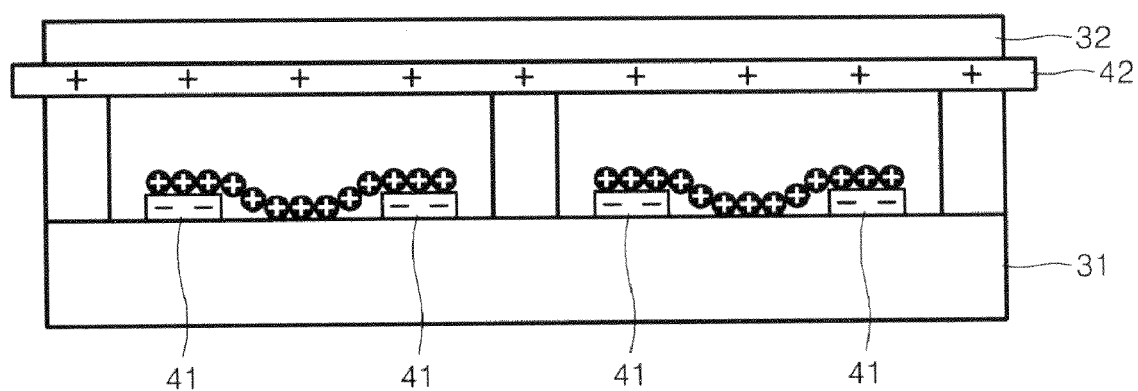
FIG. 9 illustrates the movement of electro-phoresis particles when an electric field is formed in an electro-phoresis device having a conventional structure with no third electrode according to a comparative embodiment.

FIG. 9 illustrates the movement of electro-phoresis particles in a conventional electro-phoresis device without the third electrode 43. When the first electrode (concentration electrode) 41 and the second electrode 42 are respectively charged to negative and positive electric potentials by the application of a voltage, the positively charged electro-phoresis particles are expected to be completely moved over the first electrode 41 that is negatively charged. However, actually, some electro-phoresis particles remain between the first electrodes 41, as shown in FIG. 9.

When the first electrode 41 and/or the third electrode 43 are provided a positive bias, while the second electrode 42 is provided a negative bias, the positively charged electro-phoresis particles may move over the first electrode 41, as shown in FIG. 9A.

Figure 10A:
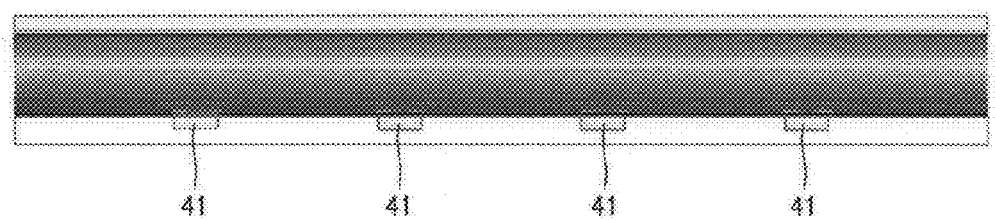
FIG. 10A illustrates a simulation result for an electric field distribution of the electro-phoresis device having a conventional structure in which the third electrode is not formed.

FIG. 10A illustrates a simulation result for an electric field distribution of the electro-phoresis device in which the third electrode is not formed. In said figure, the electric field distributions over and/or between the first electrodes appears almost the same. Accordingly, when such an electric field is applied, the electro-phoresis particles may not concentrate on the electrodes, but may be dispersed in between. In particular, having a plurality of small first electrodes and/or having the first electrodes arranged close to each other (as the integration of a display device increases) may reduce the difference in electric potential between the first electrodes 41 and the empty space that exists between the first electrodes 41. A reduction in electric potential between the first electrodes 41 and/or the empty space between the first electrodes 41 increases the amount of the electro-phoresis particles existing between the first electrodes, thereby deteriorating display quality.

Figure 10B:
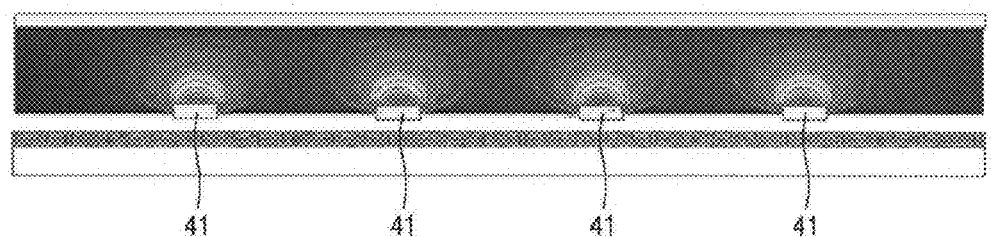
FIG. 10B illustrates a simulation result for an electric-field distribution of the electro-phoresis device in which the third electrode is formed according to another example embodiment of FIG. 8.

On the other hand, FIG. 10B illustrates a simulation result for an electric-field distribution of an electro-phoresis device in which the third electrode is formed according to example embodiments of FIG. 8. In said figure, the electric field is concentrated over the first electrodes 41, rather than between the first electrodes 41. For this reason, most electro-phoresis particles may be moved over the first electrodes to permit a high quality image. In this structure, forming the insulation layer 35 covering the third electrode 43 may induce a stronger electric field. The insulation layer may be formed using a ferroelectric material.

Further, applying the same polarity and/or same voltage bias to the first electrode 41 and/or the second electrode 42, while biasing the third electrode 43 in an opposite polarity, may generate lines of an electric force directing the first electrodes 41. This may permit the positively charged electro-phoresis particles to move more effectively toward the first electrodes 41.

The operation described above may be with respect to the positively charged electro-phoresis particles. However, the same effect may be obtained by using negatively charged electro-phoresis particles and/or changing the polarity of the voltage applied to each electrode. Also, in the above-described illustration according to example embodiments, the third electrode may be separated from the first electrode by the insulation layer. When the third electrode exists on the same plane of the first electrode, a short circuit may be generated so that such a structure is not preferable.

It should be understood that example embodiments described herein should be considered in a descriptive sense only and not for purposes of limitation. Descriptions of features or aspects of example embodiments should typically be considered as available for other similar features or aspects in other example embodiments.

What is claimed is:

1. An electro-phoresis device comprising:
   a light control layer including a plurality of electro-phoresis particles, the light control layer having a first surface and a second surface opposed to the first surface;
   a first electrode on the first surface;
   a second electrode on the second surface; and
   a third electrode on a third surface, the third surface being spaced apart from the first and the second surface along one direction and the one direction is perpendicular to the first and the second surface,
   wherein the third surface is parallel to the first and the second surface and the third electrode is controlled to have the same electric potential as one of the first and second electrodes that is positioned farther from the third electrode when the light control layer is controlled to be in both an on state and an off state.

2. The electro-phoresis device of claim 1, further comprising:
   a first substrate including the first electrode; and
   a second substrate including the second electrode;
   wherein one of the first substrate and the second substrate includes the third electrode.

3. The electro-phoresis device of claim 1, wherein
   the first electrode and the second electrode are perpendicular to each other in an X-Y matrix, and
   the third electrode is parallel to the one of the first electrode and the second electrode.

4. The electro-phoresis device of claim 1, wherein a unit pixel is defined by a portion where the first electrode and the second electrode cross each other, and a plurality of the first electrodes are provided in the unit pixel.

5. The electro-phoresis device of claim 4, wherein the unit pixel includes the third electrode, the third electrode arranged between the plurality of the first electrodes.

6. The electro-phoresis device of claim 4, wherein the third electrode is parallel to the first electrode.

7. The electro-phoresis device of claim 5, wherein the third electrode is parallel to the first electrode.

* * * * *